United States Patent [19]

Risitano et al.

[11] Patent Number: 4,884,533

[45] Date of Patent: Dec. 5, 1989

[54] METHOD OF AND AN ARRANGEMENT FOR BURNING A LIQUID OR GASEOUS FUEL IN A COMBUSTION CHAMBER OF AN INTERNAL COMBUSTION ENGINE

[76] Inventors: Antonio Risitano, V. le Andrea Doria 6, Catania, Italy, I-95125; Lanzafame Rosario, Via Vaccarini 11, S. Agata Li Battiati, Italy, I-95030; Eugen Popp, Wildenwarterstr. 20, Bundesrepublik Deutschland Munchen 82, Fed. Rep. of Germany, D-8000

[21] Appl. No.: 166,382

[22] Filed: Feb. 3, 1988

[30] Foreign Application Priority Data

Jun. 4, 1986 [DE] Fed. Rep. of Germany ....... 3618700

[51] Int. Cl.$^4$ ............................................. F02M 25/04
[52] U.S. Cl. ................................ 123/25 C; 123/25 A; 123/25 K
[58] Field of Search ........................... 123/25 A, 25 C

[56] References Cited

U.S. PATENT DOCUMENTS

| | | | |
|---|---|---|---|
| 2,017,643 | 10/1935 | Zucrow | 123/25 A |
| 3,968,775 | 7/1976 | Harpman | 123/25 B |
| 4,120,268 | 10/1978 | Bastenhof | 123/25 C |
| 4,191,134 | 3/1980 | Goodman | 123/25 |
| 4,240,380 | 12/1980 | Slagle | 123/25 |
| 4,406,255 | 9/1983 | Goodman | 123/25 |
| 4,408,573 | 10/1983 | Schlueter et al. | 123/25 |
| 4,412,512 | 11/1983 | Cottell | 123/25 |
| 4,558,665 | 12/1985 | Sandberg et al. | 123/25 C |
| 4,589,377 | 5/1986 | Van Dal | 123/25 C |

FOREIGN PATENT DOCUMENTS

| | | |
|---|---|---|
| 0009779 | 9/1979 | European Pat. Off. . |
| 2602287 | 7/1976 | Fed. Rep. of Germany . |
| 3133939 | 8/1982 | Fed. Rep. of Germany . |
| 3432787 | 3/1985 | Fed. Rep. of Germany . |
| 3236233 | 7/1985 | Fed. Rep. of Germany . |

*Primary Examiner*—E. Rollins Cross
*Attorney, Agent, or Firm*—Andrus, Sceales, Starke & Sawall

[57] ABSTRACT

A method of and an arrangement for burning a liquid or gaseous fuel in a combustion chamber of an internal combustion engine. A method of and an arrangement for burning a liquid or gaseous fuel in the presence of air or another oxidant and by the use of water in a combustion chamber (12) of an internal combustion engine, especially a reciprocating or rotary piston-type engine. To reduce the fuel consumption and the emission of harmful substances and to increase the efficiency when low-octane fuels, especially regular gasoline or acetylene, are used, water is injected during one or several selected phases, in particular during the entire operation, in an operation-dependent quantity direct into the combustion chamber (12) in such a way that a progressive "primary combustion" of fuel/air just below the critical "knock" temperature ($T_c$) occurs which initiates a "secondary combustion" of the admixed water at any point of combustion. The "secondary combustion" causes overall smooth progressive combustion within the combustion chamber (12).

28 Claims, 1 Drawing Sheet

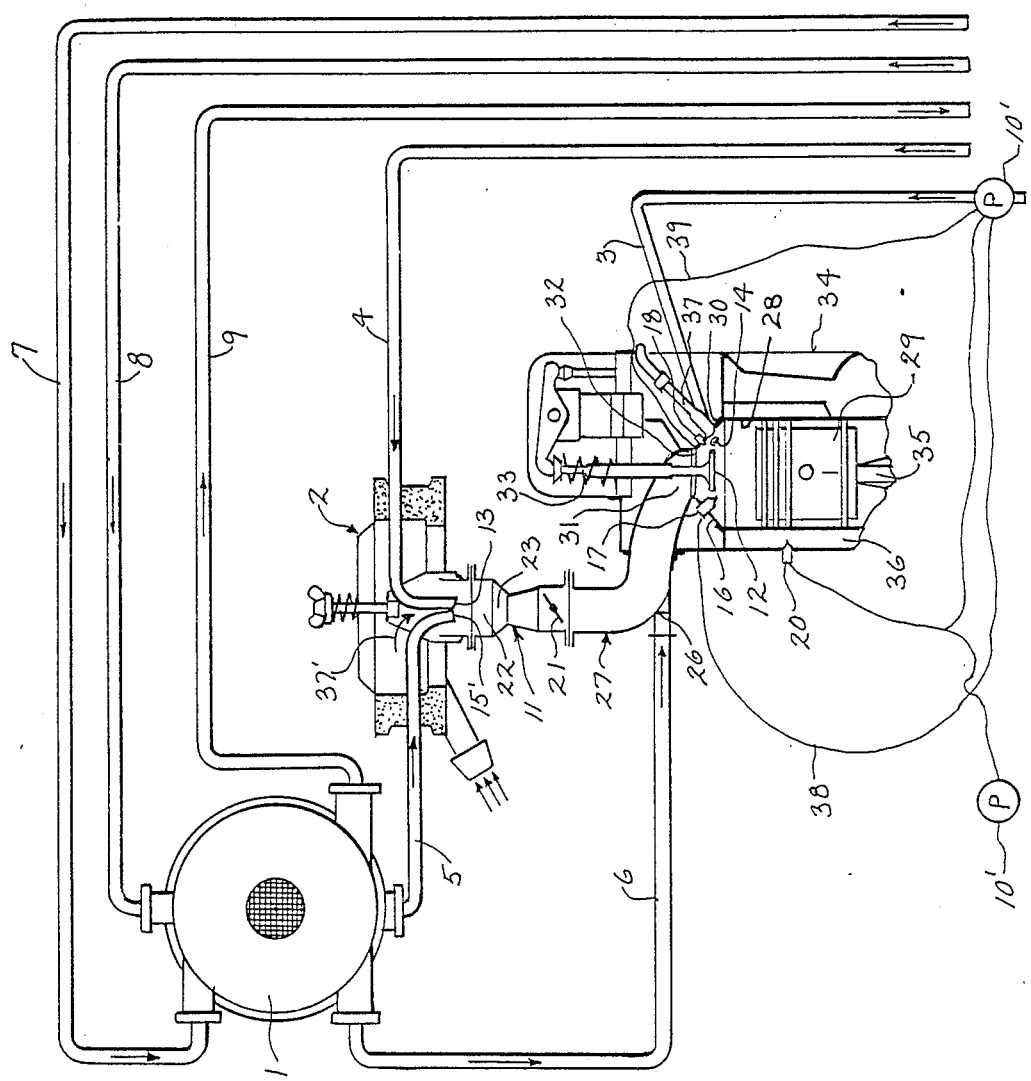

METHOD OF AND AN ARRANGEMENT FOR BURNING A LIQUID OR GASEOUS FUEL IN A COMBUSTION CHAMBER OF AN INTERNAL COMBUSTION ENGINE

The invention relates to a method of and an arrangement for burning a liquid or gaseous fuel in the presence of air or another oxidant and by the use of water in a combustion chamber of an internal combustion engine, especially a reciprocating or rotary piston engine.

Conventional internal combustion engines, especially spark ignition-type piston engines such as used in motor vehicles and stationary plants exhibit a maximum thermal efficiency of about 30%; therefore the ratio of the energy value of the fuel supplied to the combustion chamber and the finally available energy is only about 30%. Turbines, rotary piston engines or the like exhibit a similarly low efficiency.

It is generally known to increase the efficiency of internal combustion engines of the specified kind by introducing water or other non-fuels into the combustion chamber, and the following three different ways of adding water are considered advantageous:

(1) direct injection of water into the combustion chamber (for example DE-A-3,432,787 or U.S. Pat. No. 4,408,573);

(2) introduction of steam or high-humidity air into the intake passage upstream of the combustion chamber (for example U.S. Pat. No. 4,479,907 or DE-A-2,602,287); and (3) forming of a fuel-in-water emulsion and introducing it into the combustion chamber (for example DE-A-3,236,233 or U.S. Pat. No. 4,412,512).

All of these known systems operate in response to one or several operating parameters, usually in response to the engine speed (for example U.S. Pat. No. 4,191,134), the vacuum in the intake passage (for example U.S. Pat. No. 4,240,380), a knock sensor (for example U.S. Pat. No. 4,406,255), the exhaust gas pressure (for example U.S. Pat. No. 4,191,134) and/or the temperature in the intake passage (EP-A-0,009,779). All of these systems result in a greater or lesser improvement of the efficiency with a simultaneous reduction in the emission of ecologically harmful exhaust gases, mainly a reduction of CO and $NO_x$. The improvement in efficiency of the known designs should be somewhere from about 10 to 15%, which is quite remarkable. Also, the fuel consumption can be reduced by as much as 50% (U.S. Pat. No. 4,479,907).

For further increasing the efficiency and reducing the fuel consumption it has already been proposed, among other things, to inject water direct into the combustion chamber in the region of the compressed air-fuel mixture ahead of the flame front during combustion, i.e. after ignition of the air-fuel mixture but prior to self-ignition of the final gas (see DE-A-3,133,939). This is intended to keep the temperature in the combustion chamber reliably below the "uncontrolled" or critical detonation or "knock" temperature at higher compression ratios of up to 18.7:1.

Proceeding from the above-mentioned diverse prior art the inventors have set themselves the task of providing a method and an arrangement of the above-specified kind which, while the efficiency is still further improved and fuel savings of up to approximately 60 to 65% and a significant reduction of harmful substances are achieved, would permit extremely smooth combustion even at very low engine speeds, especially when using low-octane fuel such as regular gasoline or fuel of octane number "0" such as acetylene or the like.

As regards the method, the specified object is solved by the characterizing measures according to claim 1 and especially the subsequent method claims, and as regards the arrangement, the object is solved by the characterizing features according to claim 13 and especially the subsequent apparatus claims.

The gist of the present invention resides in the preparation and introduction of the air-fuel mixture into a combustion chamber while compressing and igniting the same and the introduction of water direct into the combustion chamber such that an "initial or primary combustion" of the air-fuel mixture occurs at a temperature just below the uncontrolled or critical (knock) temperature $T_c$ (knock limit), such combustion initiating the correspondingly progressing "secondary combustion" of the admixed water. The "primary cycle" and the "secondary cycle" take place at any point of combustion, i.e. at any point of the flame front, which is in contrast to the solution according to DE-A-3,133,939. In contrast to the system known from said publication, the invention aims at a "primary combustion" near the uncontrolled or critical temperature in the combustion chamber and this is controlled by corresponding admixing of water. So far, those skilled in the art have endeavoured to effect combustion at a temperature which is as far as possible from the critical temperature in the combustion chamber, so that in this way knocking of the internal combustion engine could be reliably prevented. For this reason high-octane fuels are used in high compression engines for motor vehicles, although such fuels are required only in critical load ranges while otherwise the engines can also be operated with regular gasoline. But the use of high-octane fuel (premium gasoline) results in a sufficient antiknock effect at almost any operating condition. In accordance with the invention, however, combustion shall take place just below the knock limit, wherein the peak temperature in the combustion chamber is maintained just below the uncontrolled or critical temperature at any operating condition by the controlled admixture of water. Therefore a temperature in the combustion chamber is selected which is about 1 to 5% below the critical temperature. This depends on the fuel used as well as on the critical compression ratio or the critical pressure. It has been found that by applying the system according to the invention (method and arrangement) it is possible to run the internal combustion engine at any operating state just below the knock limit, wherein "actual" compression ratios $\rho$ (fuel/air) of up to 25:1 are achieved.

Surprisingly, it is possible by applying the method and arrangement according to the invention to burn highly explosive gases such as acetylene without any difficulty in an internal combustion engine having a quasi-closed combustion chamber, as will be explained below with reference to an embodiment to be explained in detail and using a 1200 cm$^3$ Austin automotive engine.

By applying the method and the arrangement according to the invention it is possible to improve the efficiency by up to 70% as compared with conventional internal combustion engines of the specified kind. Fuel consumption may be reduced by as much as 65%. Also, the emission of CO and $NO_x$ is minimized. Above all, the internal combustion engine is suited for burning unleaded gasoline. But it should be emphasized again that the specified values can be obtained only when the "primary combustion" takes place just below the detonation temperature. The "secondary cycle" initiated thereby at any point of combustion continues the "primary cycle" such that on the whole a progressive "smooth" combustion is achieved. The "secondary cycle", as it were, dampens the "initial or primary combustion" which takes place just below the knock limit.

In order to achieve the desired "two-phase" combustion according to the invention it is essential that the fuel, air or any other oxidant and water are homogenized to a maximum extent in the combustion chamber. Then it will be ensured that combustion takes place in the specified way at any point of combustion. Preferably, to this end the water is injected into the combustion chamber at a correspondingly high pressure in finely sprayed and widely distributed form, the injected quantity being controlled in response to the "primary combustion" temperature.

Especially, the supply of water is effected in response to the temperature prevailing in the combustion chamber such that combustion starts at a temperature which is about 1 to 5% below the critical temperature $T_c$. Desirably, the "primary combustion" takes place under any operating conditions just below the critical temperature, if possible approximately 1 to 2% below the critical temperature. The injection of water is metered accordingly.

Provision is made for an additional (indirect) introduction of water controlled by the negative pressure in the intake passage, such introduction of water being superposed on the already explained introduction of water. Such introduction of water caused by negative pressure in the intake passage takes place especially when the "primary combustion" temperature rapidly approaches the critical temperature $T_c$ or when, irrespective of direct injection of water, the combustion temperature reaches a level which is less than 1% below the critical temperature. The indirect introduction of water may also be continually operative so that also during non-critical operating periods the "primary combustion" can be brought close to the critical temperature.

Surprisingly, it has been found that by the method according to the invention it is also possible to burn highly explosive acetylene ($C_2H_2$) without any risk and with extremely low consumption. In a test run with a 1200 cm$^3$ Austin engine the following values of consumption were recorded:
 running time: 10 minutes
 rotational speed: 3000 r.p.m.
 consumption of $H_2C_2$: 0.30 kg.
 consumption of $H_2O$: 3.0 kg.

The ratio of water to acetylene in this test run was therefore 10:1. The emission of harmful substances was also minimum during this test. In the combustion chamber a temperature just below the critical temperature was maintained for the primary combustion of fuel (acetylene) and air. In this test the output of the water injection pump was constant during the injection phase. Of course, it is also conceivable to make the output of the water injection pump variable in response to the temperature detected in the combustion chamber. The closer the temperature in the combustion chamber approaches the critical temperature, the higher the output of the water injection pump should be; alternatively, the additional indirect introduction of water is started.

Furthermore, the external cooling of the combustion chamber is rather important. To this end a further temperature sensor (thermocouple) is provided on the water jacket surrounding the combustion chamber and is coupled to the control unit for the cooling water pump. For an exact detection of the "primary combustion" temperature a temperature sensor is preferably also provided in the piston bottom, such sensor being protected by a ceramic layer from excessive heat and pressure. It would also be conceivable to provide a temperature sensor for the intake and/or exhaust valve for coupling to the water pump.

The method according to the invention permits combustion to be carried out with an "actual" compression ratio of up to 25:1, said "actual" compression ratio being determined by the volume taken up by fuel and oxidant (air) alone. Such high "actual" compression ratios are not possible with conventional internal combustion engines.

The water admixed with the air-fuel mixture can in part be recovered from the exhaust gases by means of per se known evaporation and condensation methods (see for example DE-C-3,102,088 or U.S. Pat. No. 4,279,223).

Of course, when the system according to the invention is used the other engine parameters must be adapted accordingly; it has been found in particular that the ignition timing must be shifted closer to the upper dead centre with simultaneous earlier opening and much later closing of the intake valve before the upper dead centre and after the lower dead centre respectively. Thus the "overlap" is increased in order to achieve good filling and flushing of the combustion chamber.

Apart from the temperature sensors mentioned above it is also possible to provide so-called detonation or knock sensors and/or pressure sensors for sensing the pressure in the combustion chamber to control the injection of pressurized water and/or the external coolant pump. The use of knock sensors is known per se; in practical use it has proven insufficiently accurate and not specific to combustion. Above all, it is impossible by means of knock sensors to control the initial combustion close to the knock limit, because usually the knock limit has already been reached or exceeded when the knock sensors respond.

Further details relating to the method and the design are described in the subclaims.

Below, the invention will be described by way of an embodiment of an internal combustion engine for the combustion of acetylene and the combustion of regular gasoline with reference to the accompanying drawing.

BRIEF DESCRIPTION OF THE DRAWING

The drawing is a schematic partial section of a reciprocating piston engine including the intake connection.

DETAILED DESCRIPTION OF THE DETAILED EMBODIMENT

Acetylene is used as fuel. 30 indicates a cylinder head including an inlet conduit 31, an inlet opening 32 and an inlet valve 33. An intake passage 11 comprising an intake manifold 26 is connected to the inlet conduit 31, the free cross-section of said intake passage being variable by means of a throttle valve 21. 28 indicates the cylinder chamber in which a piston 29 reciprocates up and down in conventional manner and is connected via a connecting rod 35 to a crank shaft (not illustrated). The cylinder chamber 28 is surrounded by a cooling water jacket 36. Water is supplied to the cooling water jacket 36 from a cooling water pump 10'. The exhaust valve also mounted in the cylinder head is not visible in the FIGURE because it is disposed at the rear of the inlet valve 33. A spark plug 37 is also mounted in the cylinder head between inlet and exhaust valves. Up to this point the conventional design of a four-stroke internal combustion engine is concerned.

The uniqueness of the illustrated embodiment of an internal combustion engine resides in the use of acetylene as fuel, on the one hand, and in the possible admixture of water to the air-fuel mixture in the intake passage 11 prior to introduction into the combustion chamber 12, on the other hand, and in the direct injection of water via a water injection nozzle 14 and a water conduit 3 associated therewith. The combustion chamber 12 is defined conventionally by the cylinder head wall on the one hand and the bottom of the piston on the other hand. Upstream of the throttle valve 21 a kind of mixing chamber 22 is formed in the intake passage 11, said mixing chamber being defined on the engine side by a constriction or venturi 23. A fuel jet 15' and a water jet 13 open into said mixing chamber 22. At the upper end of the mixing chamber 22 remote from the engine an air cleaner 2 is mounted through which combustion air 37 may flow into the mixing chamber 22 past the jets 13 and 15'. In the illustrated embodiment, the water conduit 4 and the fuel conduit 5 leading to the jets 13 and 15' pass laterally through the air cleaner 2. By the way, the air cleaner is a commercially available air cleaner for internal combustion engines.

Another fuel conduit 6 opens into the intake manifold 27 and defines a tangentially extending fuel inlet 26. This permits additional direct fuel supply to the inlet conduit 31, whereby the initial ignition or primary combustion of acetylene in the combustion chamber 12 is promoted which then initiates smooth secondary combustion of the admixed water, as explained above.

The supply of fuel, viz. acetylene, through the two fuel conduits 5 and 6 takes place by means of a pressure regulator 1 which is supplied from a feed pipe 7. The feed pipe 7 is in communication with an acetylene tank, in which the acetylene to be burned is contained in liquid state. Also, the pressure regulator 1 comprises a heat exchanger which is in communication with the coolant circuit. Through a hot water supply pipe 8 hot cooling water is supplied to the heat exchanger, in which heat is then transferred to the acetylene to be burned. The cooling water cooled thereby is returned to the cooling system via a discharge pipe 9. Heating of the initially liquid acetylene is necessary to compensate for the temperature drop occurring upon expansion and evaporation of the acetylene in the mixing chamber and to prevent icing in this region. The same applies to the region of the fuel inlet 26.

Each of the water conduits 3 and 4 is in communication with a water reservoir (not illustrated), the water conduit 3 including a water pump 10' by means of which water under pressure can be injected direct into the combustion chamber 12. Water supply by way of the water conduit 4 and the water jet 13 associated therewith takes place solely in response to the negative pressure prevailing in the intake passage 11 or the mixing chamber 22, respectively, said negative pressure being controlled by the throttle valve 21. Water supply through the jet 13 is dependent on the load in the illustrated example. But it may also be controlled by temperature and/or in response to the temperature variation. In that case the conduit 4 has an on-off valve (not illustrated) associated therewith which is controlled (opening, closing, degree of opening) in response to the primary combustion temperature. Water supply by way of the conduit 3 or water jet 14 into the combustion chamber 12 is in any case temperature controlled such that, when a predetermined temperature just below the critical temperature $T_c$ (knock temperature) in the combustion chamber 12 has been exceeded, the pump 10 is activated. Preferably, the pump 10 is activated at a temperature which is approximately from 1 to 5% below the critical (knock) temperature. Two thermocouples 17 and 18 for sensing the temperature are provided in the combustion chamber 12 and connected via electrical leads 38, 39 to the control unit of the pump 10. Moreover, a thermocouple 20 is provided for the cooling water jacket 36, and the signals from said thermocouple can likewise be coupled to the control unit of the pump 10. However, the thermocouple 20 is chiefly used for controlling the external cooling water pump 10'. The cooling water is circulated by the cooling water pump 10' more or less intensively in response to the thermocouple 20, whereby overheating of the engine is to be prevented. This is important in the present case because primary combustion just below the knock limit is desired and controlled. The output from the pump 10 may be variable in response to the temperature in the combustion chamber 12 as detected by the thermocouples 17 and 18. Preferably, one thermocouple 17 is mounted near the inlet opening 32 while the second thermocouple 18 is disposed intermediate the inlet opening 32 and the spark plug 37. By comparison of the temperatures sensed by the thus positioned thermocouples, the primary combustion temperature can be determined with high accuracy and can be brought close to the critical (knock) temperature $T_c$ by way of appropriate control of the fuel and water injection.

As explained above, a homogeneous distribution of fuel to be ignited, water, and intake air in the combustion chamber 12 is very important for the desired dual-cycle combustion. To this end water is injected into the combustion chamber 12 through a kind of spray diffuser disposed close to the spark plug 27, i.e. at the point of origin of the primary combustion. The admixture of water in the intake region of the engine preferably takes place in opposition to the fuel supply and the intake air. The fuel outlet is disposed in the mixing chamber 22 somewhat below the downwardly directed water jet 13. Due to this configuration in the mixing chamber 22 of the intake passage 11 an intimate mixing of fuel, air and water is achieved. To increase such mixing, the injected water is atomized as it exits. To this end the water jet 13 respectively includes a nozzle having fine bores through which the water may exit. Preferably, the bores are downwardly inclined in the direction of flow. Additionally, they may be inclined relative to the radial line so that an additional rotary movement about the longitudinal axes of the water jet 13 or the nozzle is impressed on the exiting water droplets. The rotary movement impressed on the water droplets may be of the same or opposite direction.

Also, measures may be provided by which the fuel exiting from the fuel jet 15' is spread out to form a fuel cone. This also contributes to the fine distribution and intimate mixing of the mentioned components.

Within the mixing chamber 22 turbulators may also be provided which are configured as noses or baffle plates that project into the mixing chamber 22. In this way the components to be mixed seemingly dwell in the mixing chamber 22 before exiting therefrom through the venturi 23 towards the inlet conduit 31.

An engine driven in accordance with the invention runs extremely smoothly down to a speed of about 200 r.p.m. with minimum emission of harmful substances. The exhaust gas temperature is comparatively low. The ratio of water to fuel consumption is about 2:1 and higher. Among other things this also depends on the other design parameters of the engine employed.

Internal combustion engines fed with acetylene are especially suited for stationary use (emergency power units and small power plants). Acetylene is readily available; it may be released, for instance, from calcium carbide. Also, the use of acetylene as fuel has been known per se for quite a long time, for instance in the carbide lamp as it is called, where the acetylene burns with atmospheric oxygen to form carbon monoxide or carbon dioxide. Nowadays, acetylene is mainly used for polymerization, whereby polyvinyl chloride (PVC) is formed. Up to now, however, no apparatus or methods have been proposed in the prior art by means of which the high energy content of acetylene is utilized for operating an internal combustion engine, and that mainly for knock-free operation of such an engine. The prior art does not contain any concrete data concerning the functionally safe running of an internal combustion engine, especially of a conventional automotive engine, by the use of acetylene. And yet acetylene offers the advantage that the starting materials for its production are sufficiently available almost everywhere without any exclusive limitation to a particularly defined geographical or political area.

Thus, there is an abundance of the starting materials lime, coal, water and salt. Lime, for instance, may be recovered from limestone in limestone quarries or limestone mountains as a very substantial component of the earth crust, from chalk or from the seas or inland waters. There is likewise a sufficiency of coal and coke for the mentioned purpose. Also, there are practically unlimited quantities of water and salt. The preparation of acetylene no longer requires any special development, because acetylene is already being produced at a large scale for other purposes, for instance for welding and cutting processes or, as explained, as an important base for plastic materials or synthetic rubber, and also for the large-scale production of fertilizers and pesticides. It is a further advantage that the combustion of acetylene in the presence of air takes place without any soot being formed. Thus, the system according to the invention presents itself as being extraordinarily harmless to the environment. It is surprising that the explosion limit is headed for irrespective of the high explosiveness of acetylene. In this respect the invention follows an apparently devious path which, however, has been proven by tests to exhibit extreme functional safety and thus to be without any risk.

The tests have shown that the ratio of water consumption to acetylene consumption is between about 2:1 and up to 7:1. The efficiency of the engine could be increased by up to 70%. The emission of harmful substances was minimum. The exhaust gases contained only negligible quantities of CO, and the same applies to nitrogen oxides $NO_x$.

Furthermore it has been shown that the operating characteristics (performance, torque and consumption) corresponded to those of conventional internal combustion engines.

Tests with gasoline supply have shown that on an average the ratio of water to gasoline (regular gasoline) to air is as follows: 0.5:1:20.

The water introduced into the combustion chamber and/or intake passage is at room temperature; preferably it is preheated to a temperature of about 65° C. This may be done by way of heat exchange with the cooling water system or by way of admixture of water recovered from the exhaust gas.

In contrast to the principles which have been universally realized up to now, the invention claims protection for the concept of carrying out a "VAPOUR CYCLE PRODUCED IN THE INTERIOR OF THE COMBUSTION CHAMBER OF AN ENDOTHERMIC ENGINE".

A thermodynamic cycle in which THE QUANTITY OF THE AVAILABLE (generated) VAPOUR, which is called secondary fluid, has a mass which is comparable to that of the combustion air required for combustion of the active charge, which is called primary fluid.

A thermodynamic cycle in which actually there are TWO ACTIVE FLUIDS present at one and the same reaction time: VAPOUR (which is generated by evaporation of the additional water) and COMBUSTION GASES (which are produced by combustion of the primary fluid), these being available in percentages of the same order of magnitude.

The injection systems and techniques known so far provide for the injection of water masses in very small quantities (a few percent of the mass of the air) and yield efficiencies which are slightly above the conventional ones. These efficiency values are in no way directly linked to the percentage quantity of injected water.

IN SHARP CONTRAST to that which is known so far, the thermodynamic cycle presently proposed can only be performed when SPECIAL THERMOPHYSICAL CONDITIONS of temperature, pressure and volume of the charge injected and compressed (prepared upstream of the intake valve or the throttle valve of the carburetor) are created in the combustion chamber of the endothermic engine, so that controlled explosion is achieved and produced in which the mass doses of the injected water maintain the reaction at equilibrium, the inherent enthalpy content rising immensely by utilizing the energy (released in the intentional explosion operation) which otherwise would NOT BE USEFUL (or would be irrecoverably lost if there were no exchange with the water injected into the charge and homigenized). Hence, the doses of water ARE THE HIGHER THE GREATER, MORE VIGOROUS AND MORE BLAZING THE EXPLOSION of the air-fuel mixture is. In the final analysis, apart from products from the operating cycle of the engine (primary fluid of the engine) there are available immense amounts of superheated steam or vapour having a very high energy content.

The part played by the injected water is therefore not the part known up to now, viz. the prevention of temperature peaks due to abnormal combustion. Rather, and this is in contrast to all of the known and so far accepted rules pertaining to engine design, IT IS THE TASK OF THE WATER EMULSIFIED IN THE CHARGE TO TAKE PART IN THE EXPLOSIVE REACTION (WHICH IS IGNITED IN A SUITABLE MANNER) by taking up very large quantities of (otherwise useless) energy, increasing its enthalpy content and successively releasing the same during the expansion period.

It follows from the above, for instance, that in a turbine installation it is possible to produce thermodynamic cycles of extremely high efficiency by combustion processes in the interior of the burner so that considerable quantities of superheated steam are obtained which are comparable with the air used as oxygen carrier. Subsequently, the steam expands in the turbine. By proceeding in the described manner one obtains values of global efficiency which are decisively higher than in conventional gas turbine units.

Hence, steam or vapour having a very high enthalpy content can be produced beyond the combustion of gases, while at the same time there is a drastic reduction in the losses occurring in the various conventional apparatus which are typical and necessary for energy producing plants (heaters, burners, superheaters, heat exchangers, condensers, etc.).

All of the features disclosed in the present documents are claimed as essential to the invention to the extent that they are novel over the prior art either individually or in combination.

We claim:

1. A method of burning a fuel in the presence of an oxidant such as air and water in a combustion chamber of an internal combustion engine, comprising supplying fuel to the combustion chamber, sensing the temperature of the fuel within the combustion chamber during at least one of a series of selected phases of engine operation, introducing water into the combustion chamber at a sensed temperature just below the critical "knock" temperature ($T_c$) and creating a progressive primary combustion of fuel and air which initiates a corresponding progressive secondary combustion of the mixed fuel and water.

2. The method of claim 1, including introducing the water in finely spray form.

3. The method of claim 1 including supplying a low-octane fuel to the combustion chamber.

4. The method of claim 1, including supplying acetylene ($C_2H_2$) to the combustion chamber as the fuel.

5. The method of claim 1 including supplying water in response to the temperature prevailing in the combustion chamber in the intake area of the internal combustion engine whereby additional water is sucked into the intake area by the load-dependent negative pressure acting in said area.

6. The method of claim 1 including interrupting the applying of water when the combustion temperature drops below a predetermined lower temperature limit of about 1 to 5% below the critical temperature ($T_c$).

7. The method of claim 5 including introducing water into the intake area of the internal combustion engine as the combustion temperature approaches the critical temperature ($T_c$) with superproportional rapidity or reaches a value which is less than 1% below the critical temperature ($T_c$).

8. The method of claim 1 including preheating the fuel prior to introducing the fuel into the combustion chamber.

9. The method of claim 5 including introducing a three component fuel/air/water mixture into a "quasi-closed" mixing space and intimately mixing and swirling the mixture prior to supplying the same to the combustion chamber.

10. The method of claim 1 including creating the combustion at an "actual" compression ratio of up to 35:1.

11. The method of claim 5 including condensing the water to be admixed to the fuel/air mixture from the exhaust gases.

12. The method of claim 5 including providing an inlet valve and introducing fuel to the combustion chamber and moving the ignition timing closer to the upper dead centre with simultaneous earlier opening and substantially later closing of the inlet valve prior to the upper dead centre and subsequent to the lower dead centre, respectively.

13. An apparatus for burning a liquid or gaseous fuel in the presence of air or other oxidant in a combustion chamber (12) of an internal combustion engine, especially a reciprocating or rotary piston-type engine, comprising metering means for metered introduction of water into the combustion chamber (12), said metering means including a pump (10) the output of which can be controlled in response to at least one operating parameter of the internal combustion engine, a sensor for sensing the combustion temperature of the combustion chamber, a control unit connected to the pump (10) and the sensor and responsive to a temperature existing upon "primary combustion" of fuel and air in the combustion chamber (12) and activating said pump in response to a temperature level just below the critical "knock" temperature ($T_c$) of about 1 to 5% below the critical temperature ($T_c$).

14. The apparatus of claim 13 wherein a water supply unit includes a jet (13) opening into the intake passage for introducing water depending on the negative pressure in the intake passage (11).

15. The apparatus of claim 13 wherein said sensor includes a thermocouple and said control unit for the pump (10) is coupled (electrical leads 38, 39) to said thermocouple, (sensor 17 and/or 18) said thermocouple being mounted projecting into the combustion chamber (12).

16. The apparatus of claim 13 wherein said thermocouple being located in a wall (cylinder head 16) defining the combustion chamber (12) and directed towards the combustion chamber (12).

17. The apparatus of claim 13 wherein said sensor includes a thermocouple (temperature sensor 20) for detecting the temperature of the external cooling water in the immediate vicinity of the combustion chamber (12) and means connected to said sensor to determine the actual primary combustion temperature such that said thermocouple (temperature sensor) which is associated with the bottom of the piston (20), said pump (10) is activated when the primary combustion temperature has risen above a lower temperature limit which is just below the critical primary knock temperature ($T_c$).

18. The apparatus of claim 13 wherein said engine includes an intake passage (12) located upstream of a throttle valve and including a quasi-closed mixing chamber (22) for intimate mixing of fuel, air and water, said chamber located in the intake passage (12) upstream of the throttle valve (22) and said mixing chamber having an inlet unit for receiving air and water and fuel in counter-current flow.

19. The apparatus of claim 18 wherein said engine includes an air cleaner (2) and an intake passage (11) with a venturi (23), said venturi being provided upstream of the throttle valve (21) and said mixing chamber being located between said air cleaner and said venturi.

20. The apparatus of claim 13 wherein said inlet unit including a water jet (13) opening into the mixing chamber (22) and having a nozzle (2) with a multiplicity of fine bores (24).

21. The apparatus of claim 20 wherein said bores (24) are directed in the direction of flow.

22. The apparatus of claim 18 wherein said inlet unit includes a water conduit (4) opening into the "quasi" mixing chamber (22), an on-off valve disposed therein which is controlled in response to temperature variations in the combustion chamber.

23. The apparatus of claim 13 including a fuel inlet (26) opening into the intake passage (intake manifold 27) downstream of the throttle valve.

24. The apparatus of claim 23 including a heat exchanger and/or a gas pressure regulator provided upstream of the fuel inlet (15', 26).

25. The apparatus of claim 13 including a detonation sensor and wherein said pump (10) being additionally controlled by said detonation sensor.

26. The apparatus of claim 13 including a thermocouple (temperature sensor) for sensing the exhaust gas temperature, and said pump (10) is connected to and controlled by said thermocouple.

27. The apparatus of claim 13 including a pressure sensor coupled to said combustion chamber and connected for activating the pump (10) such that the pump (10) is activated when a predetermined pressure just below the critical "knock" pressure ($P_c$) in the combustion chamber (12) is exceeded.

28. The apparatus of claim 22 including a detonation sensor and an on-off valve in the water conduit (4) being connected to and controlled by said detonation sensor.

* * * * *

UNITED STATES PATENT AND TRADEMARK OFFICE
CERTIFICATE OF CORRECTION

PATENT NO. : 4,884,533
DATED : November 5, 1989
INVENTOR(S) : ANTONIO RISITANO ET AL It is certified that error appears in the above-identified patent and that said Letters Patent is hereby corrected as shown below:

On the title page item [30], add to the priority data the following additional application:
---June 4, 1987 [PCT] Patent Cooperation Treaty PCT/EP87/00291---.

Signed and Sealed this

Twenty-second Day of December, 1992

*Attest:*

DOUGLAS B. COMER

*Attesting Officer*   *Acting Commissioner of Patents and Trademarks*